(12) United States Patent
Inoue et al.

(10) Patent No.: US 6,239,945 B1
(45) Date of Patent: May 29, 2001

(54) RECORDING OR PLAYBACK DEVICE FOR DISK CONTAINED IN CARTRIDGE AND THE DEVICE INCLUDING A KICKOUT MECHANISM AND A CHANGE-OVER LEVER

(75) Inventors: Tadashi Inoue, Neyagawa; Ko ichi Nakao, Higashiosaka; Toru Mori, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/413,241

(22) Filed: Oct. 7, 1999

(30) Foreign Application Priority Data

Oct. 8, 1998 (JP) .................................................. 10-285809

(51) Int. Cl.[7] .............................................. G11B 15/675
(52) U.S. Cl. ........................................................ 360/99.02
(58) Field of Search .............................. 360/99.02, 99.06

(56) References Cited

U.S. PATENT DOCUMENTS

| | | | | |
|---|---|---|---|---|
| 5,485,329 | * | 1/1996 | Lee ..................................... | 360/99.06 |
| 5,502,704 | * | 3/1996 | Ohmori ............................... | 369/77.2 |
| 5,610,890 | | 3/1997 | Eum et al. ......................... | 369/77.2 |
| 5,699,210 | * | 12/1997 | Thompson et al. ............... | 360/99.06 |
| 5,808,831 | * | 9/1998 | Tanaka ............................. | 360/99.06 |
| 6,118,618 | * | 9/2000 | Kumakura ........................ | 360/99.02 |

FOREIGN PATENT DOCUMENTS

| | | |
|---|---|---|
| 0 554 065 | 8/1993 | (EP) . |
| 0 644 540 | 3/1995 | (EP) . |
| 9-128856 | 5/1997 | (JP) . |
| 0 592 192 | 4/1994 | (WO) . |
| WO 97 47005 | 12/1997 | (WO) . |

* cited by examiner

Primary Examiner—Jefferson Evans
(74) Attorney, Agent, or Firm—Armstrong, Westerman, Hattori, McLeland & Naughton, LLP

(57) ABSTRACT

A disk recording or playback device comprises a holder pivoted to a chassis and reciprocatingly movable between an open position in which the holder is raised for inserting thereinto a cartridge containing a disk and a closed position in which the holder is laid on the chassis, a kickout mechanism having an engaging piece engageable with the holder and biased by a spring to urge the cartridge in a direction of discharge from the holder, the kickout mechanism extending into the holder and pushable by the insertion of the cartridge against the spring when the holder is in the open position to bring the engaging piece into engagement with the holder, and a change-over lever pivotally movably provided on the chassis for releasing the kickout mechanism from engagement with the holder during the transition of the holder from the closed position to the open position. The pivot portion of the holder and a pivot portion of the change-over lever are provided on the same surface of one member mounted on the chassis.

2 Claims, 6 Drawing Sheets

RECORDING OR PLAYBACK DEVICE FOR DISK CONTAINED IN CARTRIDGE AND THE DEVICE INCLUDING A KICKOUT MECHANISM AND A CHANGE-OVER LEVER

FIELD OF THE INVENTION

The present invention relates to a recording or playback device for a disk contained in a cartridge.

BACKGROUND OF THE INVENTION

FIG. 3 is a perspective view of a cartridge 60 containing such a disk 6. The cartridge 60 is provided at a side portion thereof with a shutter 61 for opening the cartridge to expose the disk 6 or alternatively closing the cartridge. A guide groove 62 is formed in the end face of the side portion over the entire length. The upper surface of the cartridge 60 bears an arrow mark 63 indicating the direction of insertion of the cartridge 60.

FIG. 6 is a perspective view of a conventional disk recording or playback device to show the cartridge 60 in the course of insertion. FIGS. 7A and 7B are side elevations of the conventional disk recording or playback device, FIG. 7A showing an open position permitting the insertion of the cartridge 60, FIG. 7B showing the cartridge 60 as completely inserted. FIGS. 8A and 8B are side elevations of the conventional disk recording or playback device, FIG. 8A showing a closed position in which the cartridge 60 is loaded on a chassis 1, FIG. 8B showing the holder 3 to be described below during transition from the closed position to the open position.

A holder 3 for the cartridge 60 to be inserted in has a base end pivoted as at 41 to a pair of support plates 18, 18 projecting upward from the chassis 1. The holder 3 has a side wall provided with a kickout member 5 which is slidable in the direction of insertion of the cartridge 60. With the device of the type described, the cartridge 60 in the holder 3 is urged by the kickout member 5 toward the direction of discharge from the holder 3 during the transition of the holder 3 from the closed position to the open position. The arrangement for this purpose will be described below.

The side wall of the holder 3 shown in FIG. 6 has a lug 30 projecting into a path of movement of the kickout member 5. The kickout member 5 is made from a metal sheet by bending and comprises a slide plate 50 fitting in an elongated slit 37 formed in the side wall of the holder 3. The slide plate 50 has a contact piece 57 extending into the holder 3 and pushable by the cartridge 60, an engaging piece 58 deformable on deflection by coming into contact with the lug 30 on the holder 3, and a pusher 59 for pivotally moving the change-over lever 40 to be described below. The kickout member 5 is biased by a spring 54 toward the cartridge discharge direction. When the holder 3 is empty, the engaging piece 58 of the kickout member 5 is positioned toward the cartridge discharge direction beyond the lug 30 (see FIG. 7A).

The change-over lever 40 is pivoted as at 40a to a second support plate 19 projecting upward from the chassis 1 and is movable into the path of movement of the kickout member 5. The change-over lever 40 is biased clockwise by a torsion spring (not shown) fitted to the pivot portion 40a, and restrained from moving clockwise by contact with a projection 19a on the second support plate 19. The pivot portion 40a comprises a pin 16 projecting outward from the second support plate 19 and fitting in a hole formed in the change-over lever 40.

When inserted into the holder 3 in the open position shown in FIG. 7A, the cartridge 60 pushes in the kickout member 5 against the spring 54. The engaging piece 58 advances while being deflected downward by contact with the lug 30 on the holder 3, restores itself from deflection upon moving out of bearing contact with the lug 30, and engages with the lug 30 as shown in FIG. 7B. Thus, the cartridge 60 is completely inserted into the holder 3.

When the holder 3 is moved down about the pivot portion 41 from the state shown in FIG. 7B, the pusher 59 of the kickout member 5 temporarily turns the change-over lever 40 counterclockwise against the action of the torsion spring. Upon the pusher 59 moving out of contact with the change-over lever 40, the change-over lever 40 returns to its original position as shown in FIG. 8A. The holder 3 is now in its closed position.

When the holder 3 is pivotally moved upward from the closed position shown in FIG. 8A, the pusher 59 comes into contact with the change-over lever 40. The lever 40, which is restrained from moving clockwise by the projection 19a, presses and elastically deforms the pusher 59. This disengages the engaging piece 58 from the lug 30, causing the kickout member 5 to be returned by the force of the spring 54 toward the direction of discharge of the cartridge 60. The cartridge 60 is discharged by being pushed by the contact piece 57, and the kickout member 5 returns to the open position shown in FIG. 7A.

With the conventional device, however, the first support plates 18 provided with the pivot portion 41 for the holder 3 are separate from the second support plate 19 having the change-over lever 40 pivoted thereto as at 40a, so that when the device is manufactured in large quantities, variations are likely to occur in the distance between the pivot portion 41 of the holder 3 and the pivot portion 40a of the change-over lever 40. The timing at which the kickout member 5 is disengaged from the lug 30 will then differ from device to device, entailing the drawback of altering the cartridge discharge timing. It is also likely that the timing at which the cartridge 60 is completely inserted into the holder 3 will differ.

SUMMARY OF THE INVENTION

An object of the present invention is to restrict variations in the distance between the pivot portion of the holder 3 and the pivot portion of the change-over lever 40 so as to obviate variations in the timing at which the cartridge is discharged from or completely inserted into the holder 3.

The present invention provides a disk recording or playback device which comprises a holder 3 supported on a chassis 1 for containing a cartridge 60 and reciprocatingly movable between an open position and a closed position, a kickout mechanism engageabl with the holder 3, and a change-over lever 40 for releasing the kickout mechanism from engagement with the holder 3 during the transition of the holder 3 from the closed position to the open position. A pivot portion 41 of the holder 3 and a pivot portion 45 of the change-over lever 40 are provided on a common member on the chassis 1 and each include a pivot projecting from the member. The pivot portions have respective axes L1 and L2 which are approximately parallel. More specifically, the pivot portions 41, 45 are provided on the same surface of the member on the chassis 1.

This arrangement ensures mass production of brackets 4 which are accurate in the distance between the pivot portions 41, 45, that is, which are diminished in variations in this distance, consequently obviating the likelihood that the timing at which the cartridge 60 is discharged from or completely inserted into the holder 3 will vary from device to device.

DETAILED DESCRIPTION OF THE PREFERRED EMBODIMENT

[overall Construction]

An embodiment of the invention will be described below with reference to the drawings.

Figure 1:
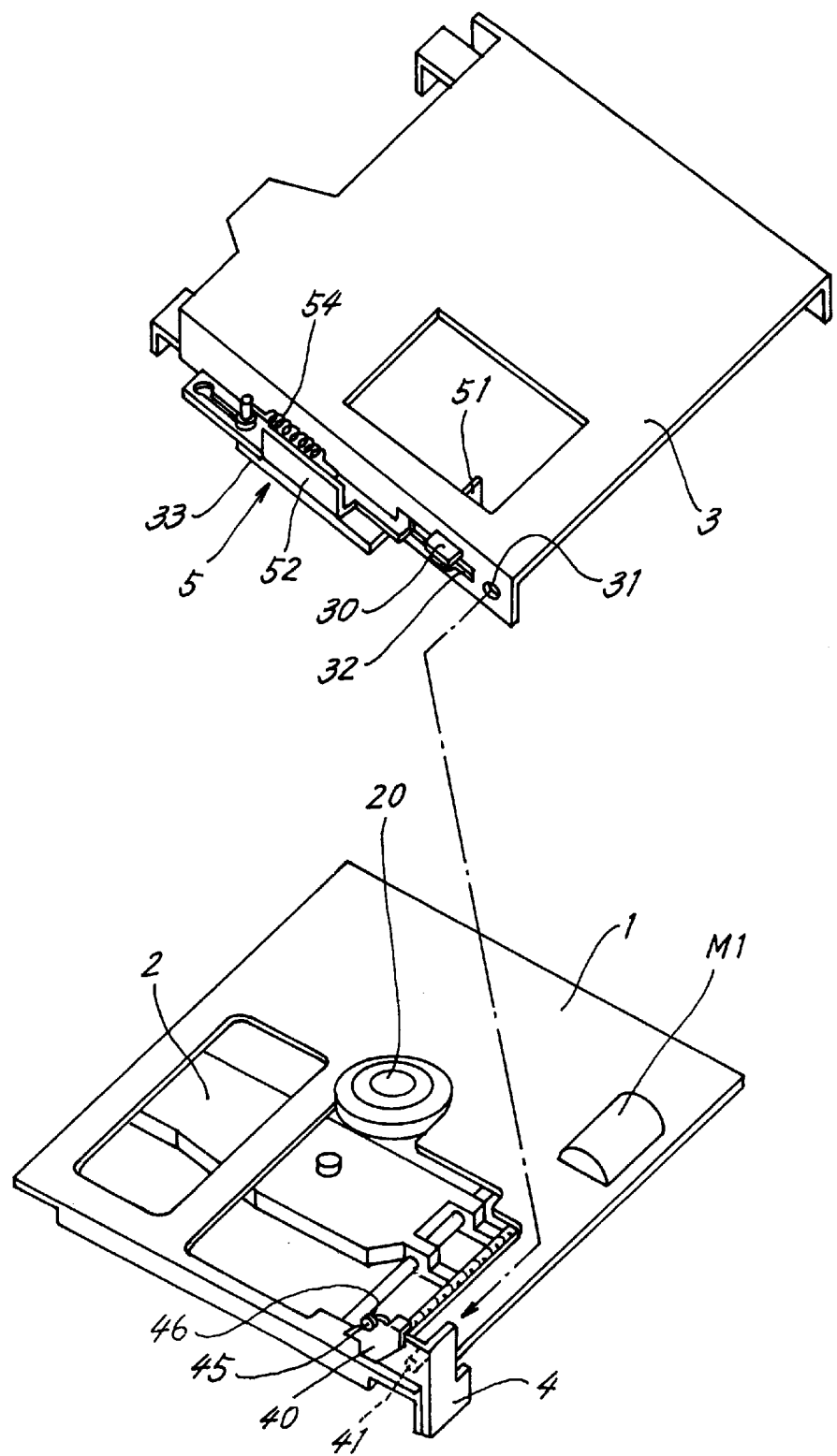
FIG. 1 is an exploded perspective view of a disk recording or playback device.

FIG. 1 is an exploded perspective view of a disk recording or playback device. Incidentally for convenience of description, the spring member 8 to be described below is not shown in FIG. 1. The device comprises a chassis 1 and a holder 3 pivoted to the chassis 1. As is already known, the chassis 1 has mounted thereon a pickup 2 and a turntable 20 for rotating a disk.

Attached to a corner portion of the chassis 1 is a bracket 4 having a pivot 41 projecting inward from a side surface thereof. The bracket 4 also has a change-over lever 40 pivoted as at 45 to the side surface. The pivot portion 45 comprises a pin 46 projecting outward from the bracket 4 and fitted in a hole formed in the change-over lever 40.

A hole 31 having the pivot 41 fitted therein is formed in a side wall of the holder 3 at one end portion thereof. The holder 3 is reciprocatingly movable between an open position in which the holder 3 is raised obliquely as moved about the pivot 41 and a closed position in which a cartridge 60 in the holder 3 is loaded on the turntable 20 on the chassis 1.

The side wall of the holder 3 is provided with an outwardly projecting lug 30 positioned closer to the cartridge discharge side of the holder than the hole 31, and an opening 32 in the form of a horizontally elongated slit and positioned under the lug 30. Disposed closer to the cartridge discharge side than the lug 30 is a support plate 33 projecting horizontally from the holder 3 and carrying thereon a kickout member 5 which is slidable along the direction of insertion or discharge of the cartridge. The kickout member 5 is biased by a spring 54 toward the cartridge discharge direction. As in the conventional device, the cartridge 60 is urged by the kickout member 5 toward the direction of discharge thereof from the holder 3 during the transition of the holder 3 from the closed position to the open position.

Figure 2:
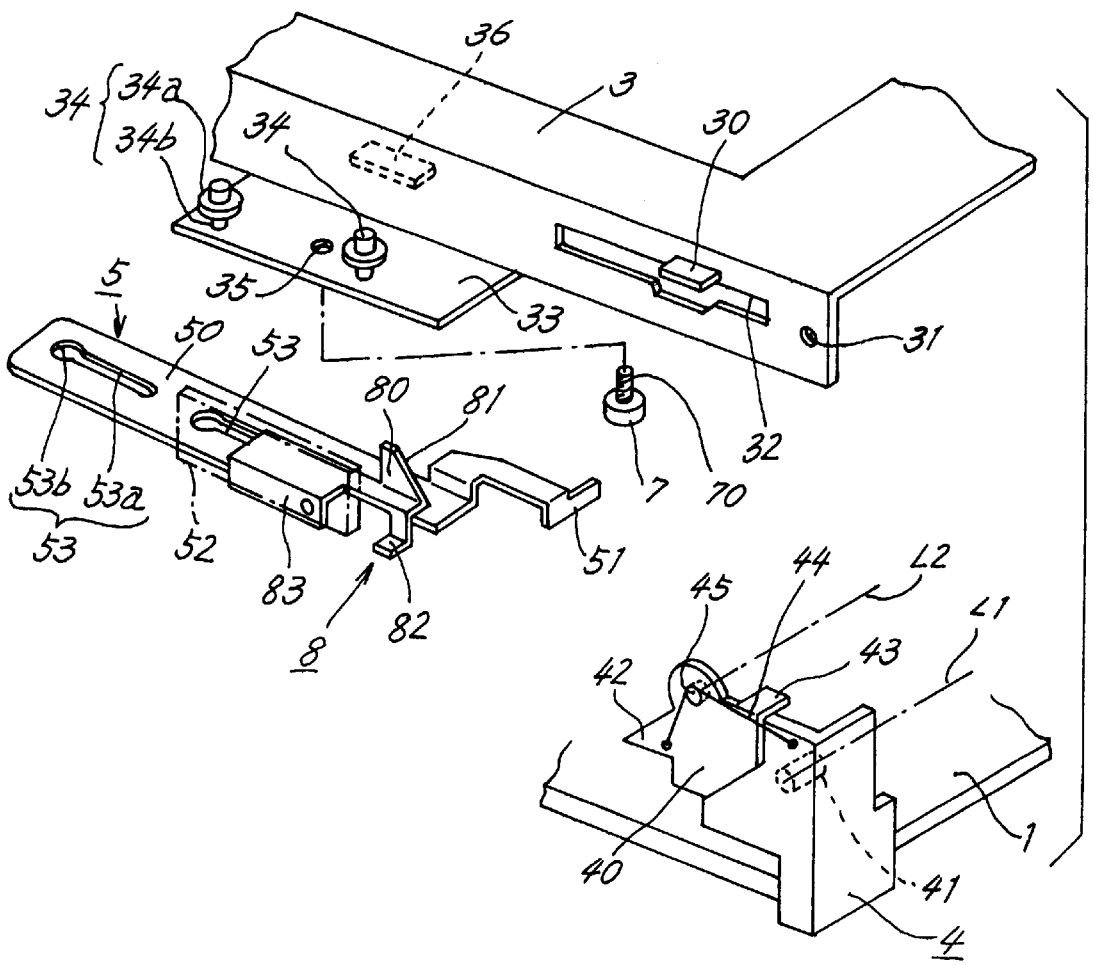
FIG. 2 is an exploded perspective view of a kickout member and a holder.
Figure 3:
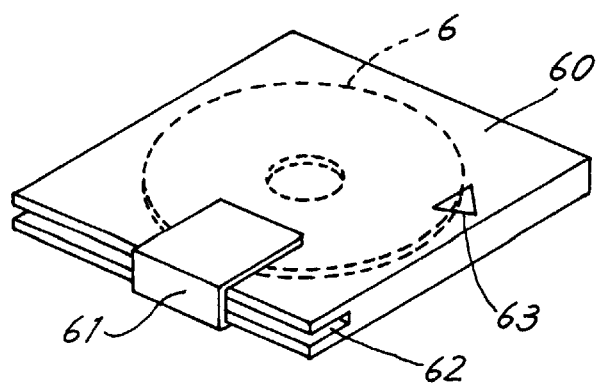
FIG. 3 is a perspective view of a cartridge.

FIG. 2 is an exploded perspective view of the kickout member 5 and the holder 3. The holder 3 is provided with a shutter opening piece 36 on the inner surface of the side wall thereof. When the cartridge 60 is inserted into the holder 3, the shutter opening piece 36 fits into the guide groove 62 (see FIG. 3) of the cartridge 60 to push the shutter 61 open.

The kickout member 5 comprises a kickout piece 51 projecting from one end of a slide plate 50 having its length positioned in parallel to the cartridge insertion-discharge direction. The kickout piece 51 extends into the holder 3 through the opening 32. An upright wall 52 extends upward from a side portion of the slide plate 50 as indicated in a chain line. Attached to the inner surface of the upright wall 52 is a spring member 8 made from an elastic plate by bending. The spring member 8 comprises a base plate 83 attached to the upright wall 52, an engaging piece 80 extending upward from the front end of the base plate 83, and a pusher 82 extending downward from the base end front end. The engaging piece 80 has a slanting edge 81 at its front end. The engaging piece 80 is elastically deformable by coming into contact with the lug 30 of the holder 3.

The slide plate 50 has two slits 53, 53 extending longitudinally thereof and having fitted therein respective pins 34, 34 provided upright on the support plate 33 of the holder 3. The slide plate 50 is slidable along the cartridge insertion or discharge direction.

The change-over lever 40 pivoted as at 45 to the bracket 4 on the chassis 1 has an operating piece 42 adapted for contact with the pusher 82 of the spring member 8, and a stopper 43 in contact with the upper end of the bracket 4. The change-over lever 40 is biased clockwise by a torsion spring 44 fitted to the pivot portion 45, and is restrained from moving clockwise by the stopper 43.

[Holder Opening-Closing Movement]

Figure 4A:
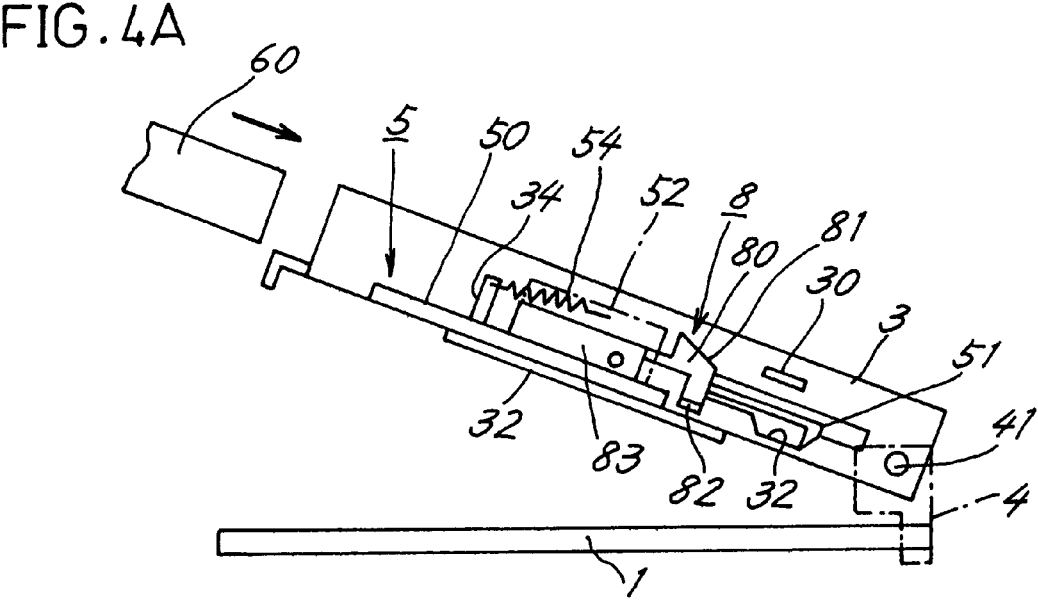
FIGS. 4A and 4B are side elevations showing the holder in an open position, FIG. 4A showing the cartridge when it is about to be inserted into the holder, FIG. 4B showing the cartridge when it is completely inserted into the holder.
Figure 4B:
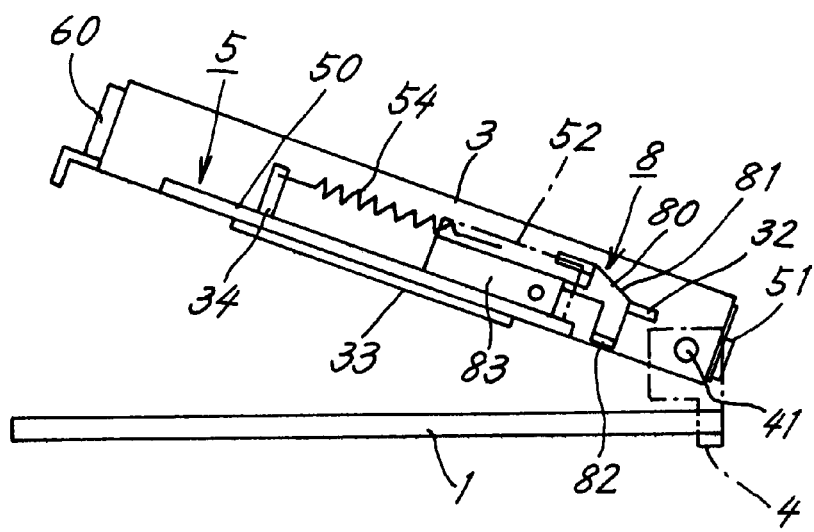

FIGS. 4A and 4B are side elevations showing the holder 3 in its open position, FIG. 4A showing the cartridge 60 when it is about to be inserted into the holder, FIG. 4B showing the cartridge 60 as completely inserted in the holder. For convenience of description, the change-over lever 40 is not shown in FIGS. 4A and 4B.

Insertion of Cartridge in Open Position

When the cartridge 60 is inserted into the holder 3 in its open position shown in FIG. 4A, the front end face of the cartridge 60 toward the direction of insertion pushes in the kickout piece 51 of the kickout member 5 against the spring 54, moving the kickout member 5 along the support plate 33. When the slanting edge 81 of the engaging piece 80 comes into contact with the lug 30 of the holder 3, the engaging piece 30 advances as elastically deformed downward, moving past the lug 30 toward the direction of insertion of the cartridge 60, whereupon the engaging piece 30 elastically restores itself and engages with the lug 30. With the kickout member 5 restrained from moving inadvertently in this state, the cartridge 60 is held inserted completely as shown in FIG. 4B.

Figure 5A:
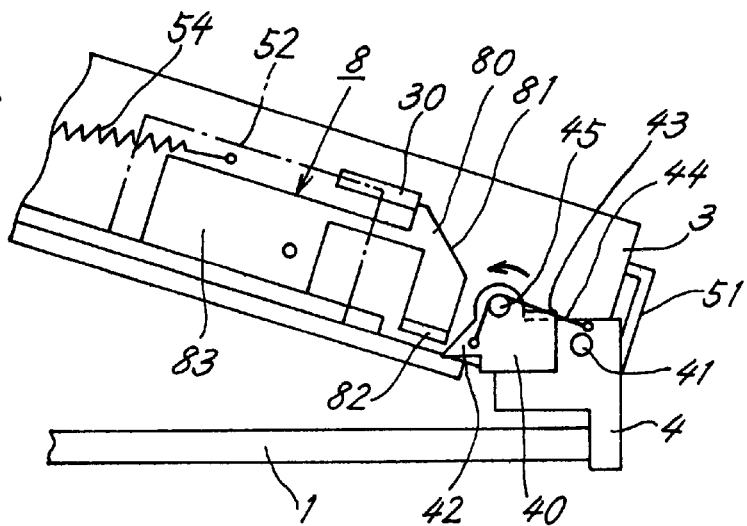
FIGS. 5A, 5B and 5C are enlarged fragmentary side elevations of the holder, FIG. 5A showing the cartridge as completely inserted in the holder in its open position, FIG. 5B showing the holder in a closed position, FIG. 5C showing the holder during transition from the closed position to the open position.
Figure 5B:
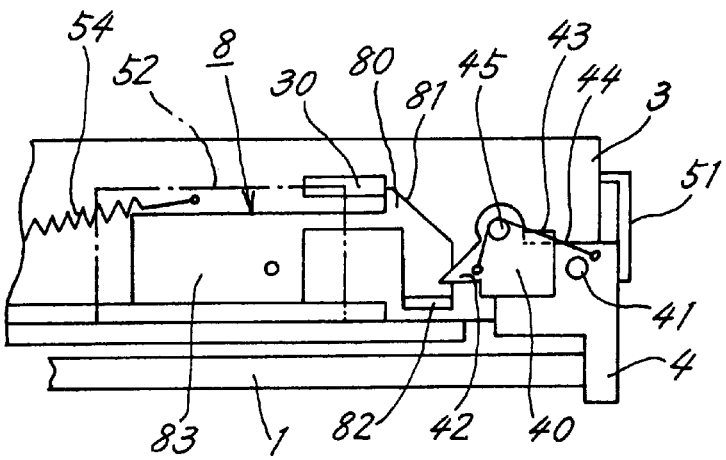
Figure 5C:
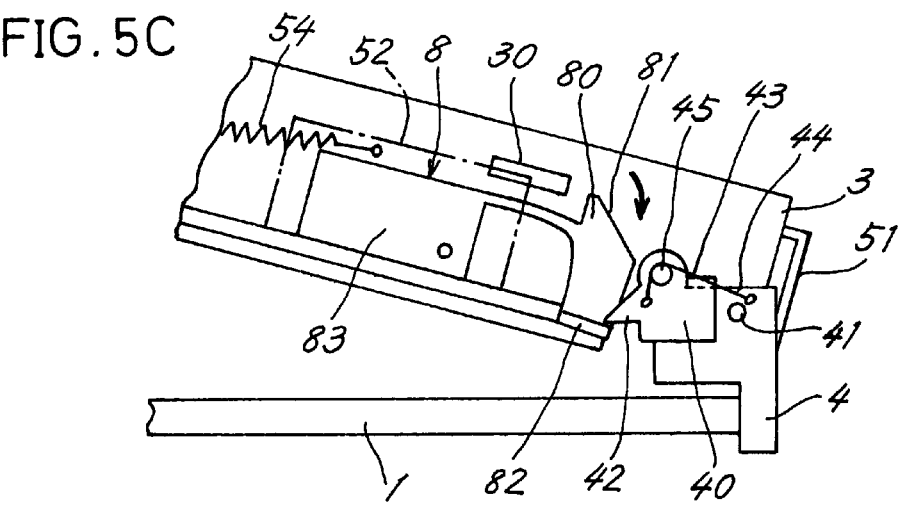
Figure 6:
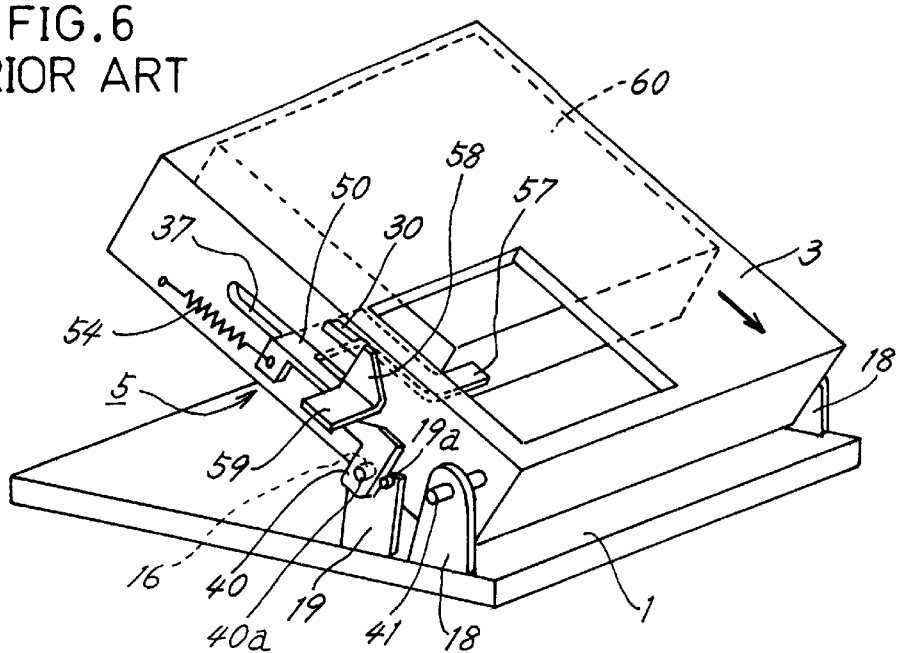
FIG. 6 is a perspective view of a conventional disk recording or playback device to show a cartridge while it is being inserted.
Figure 7A:
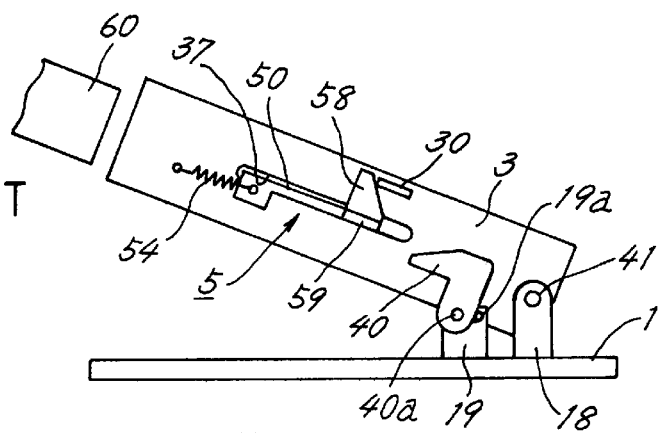
FIGS. 7A and 7B are side elevations of the conventional disk recording or playback device, FIG. 7A showing an open position permitting the insertion of a cartridge, FIG. 7B showing the cartridge as completely inserted.
Figure 7B:
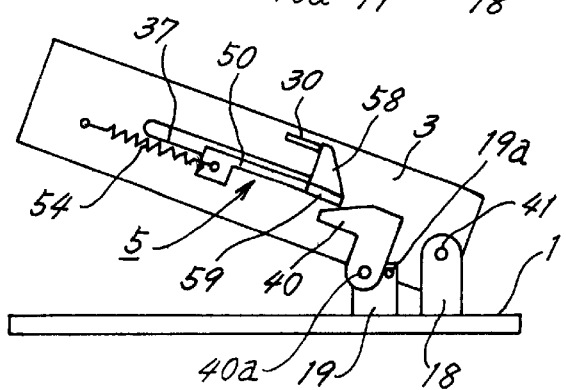
Figure 8A:
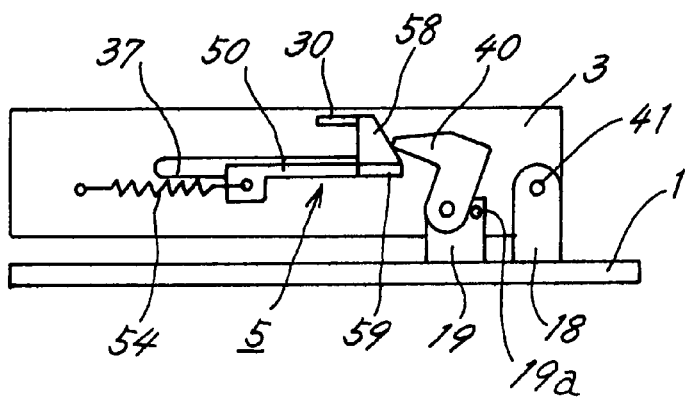
FIGS. 8A and 8B are side elevations of the conventional disk recording or playback device, FIG. 8A showing a closed position in which the cartridge is loaded on a chassis, FIG. 8B showing a holder during transition from the closed position to the open position.
Figure 8B:
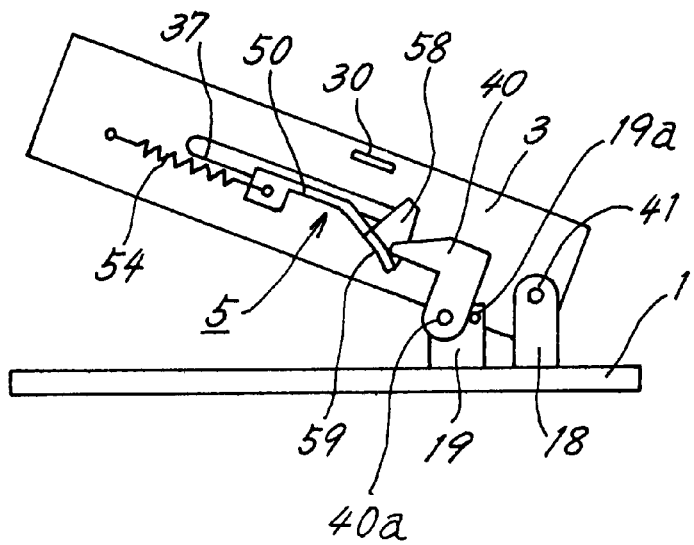

FIGS. 5A, 5B and 5C are enlarged fragmentary side elevations of the holder 3, FIG. 5A showing the cartridge 60 as completely inserted in the holder 3 in its open position, FIG. 5B showing the holder 3 in its closed position, FIG. 5C showing the holder 3 during transition from the closed position to the open position. With the cartridge in the completely inserted state as shown in FIG. 5A, the pusher 82 of the spring member 8 is positioned above the operating piece 42 of the change-over lever 40.

Descent to the Closed Position

When the holder 3 is moved down about the pivot 41, the pusher 82 pushes the operating piece 42 of the change-over lever 40, moving the lever 40 counterclockwise against the torsion spring 44. When the operating piece 42 is moved out of contact with the pusher 82, the change-over lever 40 is returned to the original position by the torsion spring 44, and the holder 3 is brought to the closed position shown in FIG. 5B.

Rise to the Open Position

When the holder 3 is turned upward from the closed position of FIG. 5B to unload the cartridge 60, the pusher 82 comes into contact with the operating piece 42 of the change-over lever 40, biasing the lever 40 clockwise. However, since the stopper 43 is in contact with the upper end of the bracket 4, restraining the lever 40 from moving clockwise, the pusher 82 is pushed downward, and the spring member 8 is elastically deformed as seen in FIG. 5C. This releases the spring member 8 from engagement with the lug 30, whereupon the spring 54 returns the spring member 8 and the kickout member 5 toward the direction of discharge of the cartridge 60. The kickout piece 51 of the kickout member 5 pushes the cartridge 60 outward from the position shown in FIG. 4B toward the direction of discharge from the holder 3. This permits the user to readily grasp the cartridge 60.

According to the present embodiment, the axis L1 of the pivot portion 41 of the holder 3 and the axis L2 of the pivot portion 45 of the change-over lever 40 are approximately parallel as shown in FIG. 2. The pivot 41 about which the holder 3 is moved and the pin 46 providing the pivot portion 45 of the change-over lever 40 are provided on the same surface of the bracket 4.

While the bracket 4 is generally made from a metal sheet by blanking or from a synthetic resin by injection molding, variations in the distance between the pivot portion 41 of the holder 3 and the pivot portion 45 of the change-over lever 40 can be diminished even if the bracket 4 is manufactured in large quantities by providing the two pivot portions on the same surface of the bracket. This eliminates the likelihood that the timing at which the cartridge 50 is discharged or completely inserted will differ from device to device.

When the bracket 4 is made from a metal sheet, the pivot 41 on the bracket 4 may formed by drawing. The pivot 41 and the pin 46 may be provided on the holder 3 and the change-over lever 40, respectively, with respective holes formed in the bracket 4 for the pivot 41 and the pin 46 to fit in.

What is claimed is:

1. A disk recording or playback device comprising a holder pivoted to a chassis and reciprocatingly movable between an open position in which the holder is raised for inserting thereinto a cartridge containing a disk and a closed position in which the holder is laid on the chassis a kickout mechanism having an engaging piece engageable with the holder and biased by a spring to urge the cartridge in a direction of discharge from the holder, the kickout mechanism extending into the holder and pushable by the insertion of the cartridge against the spring when the holder is in the open position to bring the engaging piece into engagement with the holder, and a changeover lever pivotally movably provided on the chassis for releasing the kickout mechanism from engagement with the holder during the transition of the holder from the closed position to the open position, the disk recording or playback device being characterized in that the pivot portion of the holder and a pivot portion of the change-over lever are provided on a common member mounted on the chassis, each of the pivot portions including a pivot projecting from the holder or the common member, the pivot portions having respective axes L1, L2 which are approximately parallel.

2. A disk recording or playback device according to claim 1 wherein the pivot portion of the holder and the pivot portion of the change-over lever are provided on the same surface of the common member on the chassis, and the change-over lever holds the kickout mechanism in engagement with the holder during the transition of the holder from the open position to the closed position.

* * * * *